United States Patent
Bresolin

(10) Patent No.: US 6,393,213 B1
(45) Date of Patent: May 21, 2002

(54) THERMOSTATIC HEATER DEVICE FOR LIQUIDS, IN PARTICULAR FOR THE WATER OF AQUARIUMS

(75) Inventor: Valerio Bresolin, Bassano Del Grappa (IT)

(73) Assignee: Hydor S.r.l. (IT)

( * ) Notice: Subject to any disclaimer, the term of this patent is extended or adjusted under 35 U.S.C. 154(b) by 0 days.

(21) Appl. No.: 09/787,898

(22) PCT Filed: Sep. 30, 1999

(86) PCT No.: PCT/EP99/07237

§ 371 Date: Mar. 28, 2001

§ 102(e) Date: Mar. 28, 2001

(87) PCT Pub. No.: WO00/22882

PCT Pub. Date: Apr. 20, 2000

(30) Foreign Application Priority Data

Oct. 13, 1998 (IT) .......................................... VE98A0040

(51) Int. Cl.[7] .................................................. H05B 1/02
(52) U.S. Cl. ........................................ 392/498; 219/538
(58) Field of Search ................................ 392/498, 497, 392/485, 465, 466; 219/538, 593

(56) References Cited

U.S. PATENT DOCUMENTS 976,405 A * 11/1910 Shoenburg
1,004,165 A * 9/1911 Hanscom et al. ........... 219/517
2,511,902 A * 6/1950 Cabrera ....................... 219/523
5,750,960 A    5/1998 Bresolin
5,859,411 A * 1/1999 Bresolin et al. ............. 219/523

FOREIGN PATENT DOCUMENTS

EP      0 747 507 A1      8/1995
WO      WO 95/31882       5/1995

* cited by examiner

Primary Examiner—Teresa Walberg
Assistant Examiner—Thor Campbell
(74) Attorney, Agent, or Firm—Hoffman, Wasson & Gitler

(57) ABSTRACT

A thermostatic heater device for liquids, in particular for the water of aquariums, comprising within a tubular casing: a rigid support (2) constructed of electrically insulating, heat-conducting material, at least one layer of electrically insulating, heat-resistant flexible film (14) wound about said tubular support, at least one resistive element (16) arranged on a dielectric film wrapped about said first flexible film, a layer of a second electrically insulating, heat-resistant flexible film (14) wound about said dielectric film already wrapped about said layer of first flexible film, means (22) for connecting said resistive element to the electrical supply, and hydraulic sealing means (4, 6) between said tubular support (2) and said casing (8).

9 Claims, 4 Drawing Sheets

THERMOSTATIC HEATER DEVICE FOR LIQUIDS, IN PARTICULAR FOR THE WATER OF AQUARIUMS

This invention relates to a thermostatic heater device for liquids, in particular for the water of aquariums.

Heater devices with temperature control for liquids, in particular for the water of aquariums, are known. One of these is described in U.S. Pat. No. 5,750,960 and comprises a dielectric film on which there is printed a resistive element electrically powered via a thermostat.

This dielectric film is housed within an annular interspace bounded by two cylindrical walls, the inner of which is constructed of glass and through the interior of which the liquid to be heated passes. One portion of the annular interspace has a greater width to define a chamber housing the thermostat, which is provided with a heat-sensitive element facing the heating element in such a manner as to determine its temperature and hence, indirectly, the temperature of the water circulating through the device.

This known heater device has proved well suited in particular to maintaining the water of an aquarium at the desired temperature, but at the same time has highlighted some aspects which could be improved.

One of these is that the heating element is in direct contact with the glass of the inner cylindrical wall, and hence does not posses the characteristic of double electrical insulation, as currently prescribed for all non-earthed electrical appliances not powered at low voltage. In this respect, the provision of double insulation poses constructional problems which up to the present time have not been satisfactorily solved.

A further improvable aspect is that in that particular device the heat-sensitive element is positioned to the side of the heating element, not in contact with the cylindrical glass wall. Because of this the sensitivity of the regulation is influenced by the temperature not only of the water, ie the quantity effectively to be controlled, but also of the heating element.

An object of the invention is to provide a thermostatic heater device in which, in contrast to known devices, those parts under voltage are provided with double insulation, so satisfying current regulations.

A further object of the invention is to provide a thermostatic heater device which is of extremely simple production and safe and reliable operation, even if abnormal situations arise.

These and further objects are attained according to the invention through a thermostatic heater device as claimed in claim 1.

Figure 1:
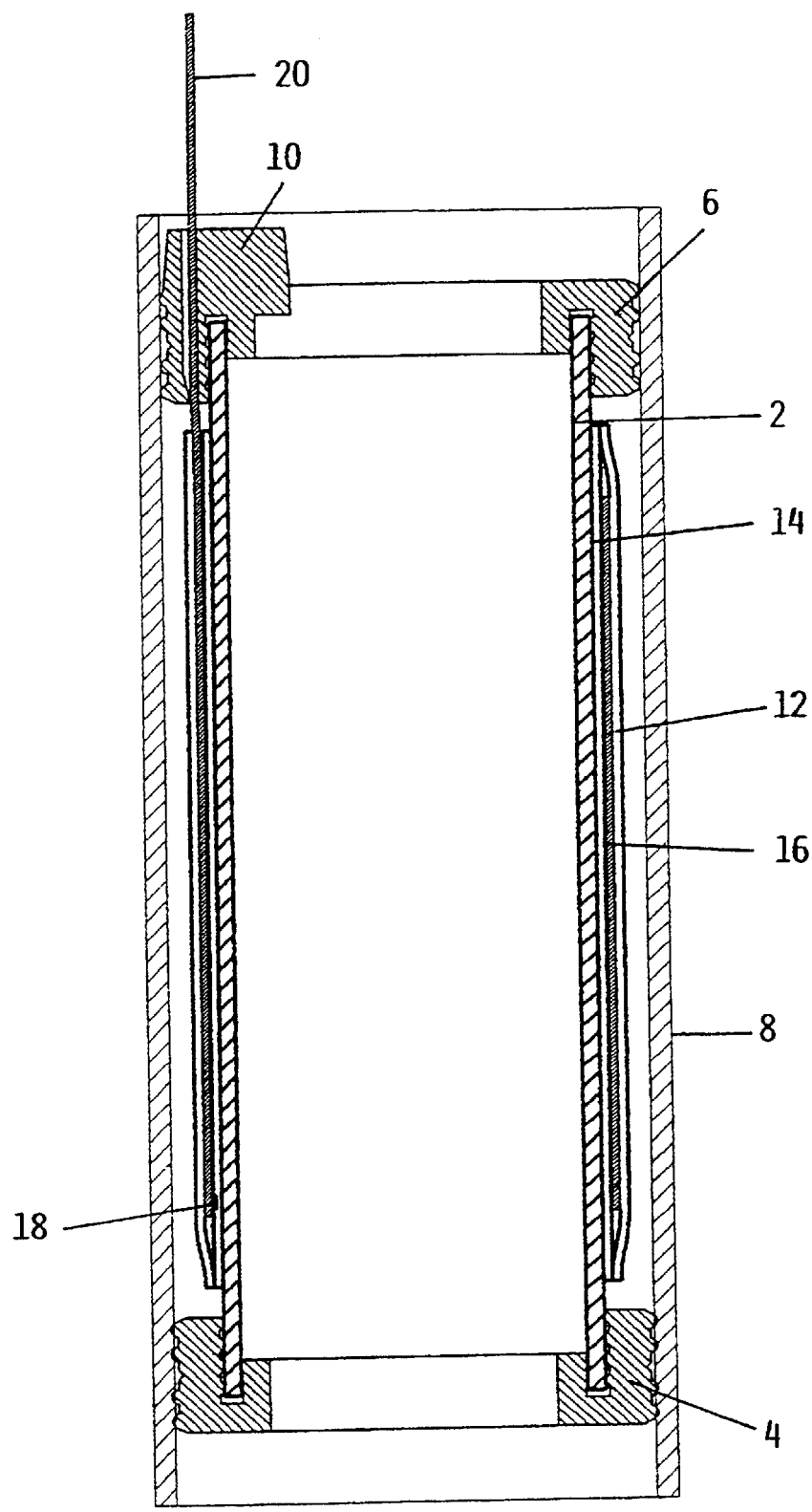
Figure 2:
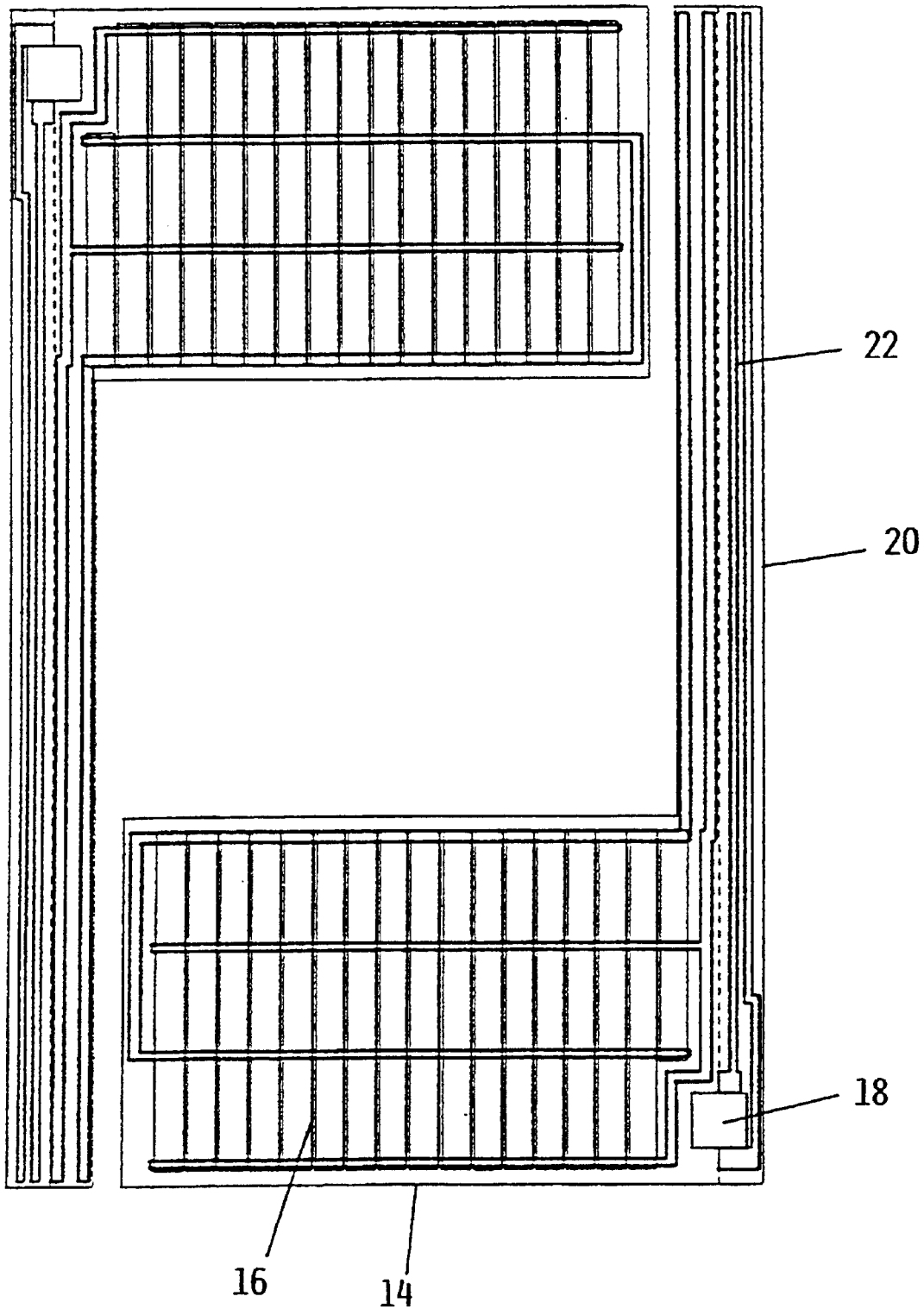
Figure 3:
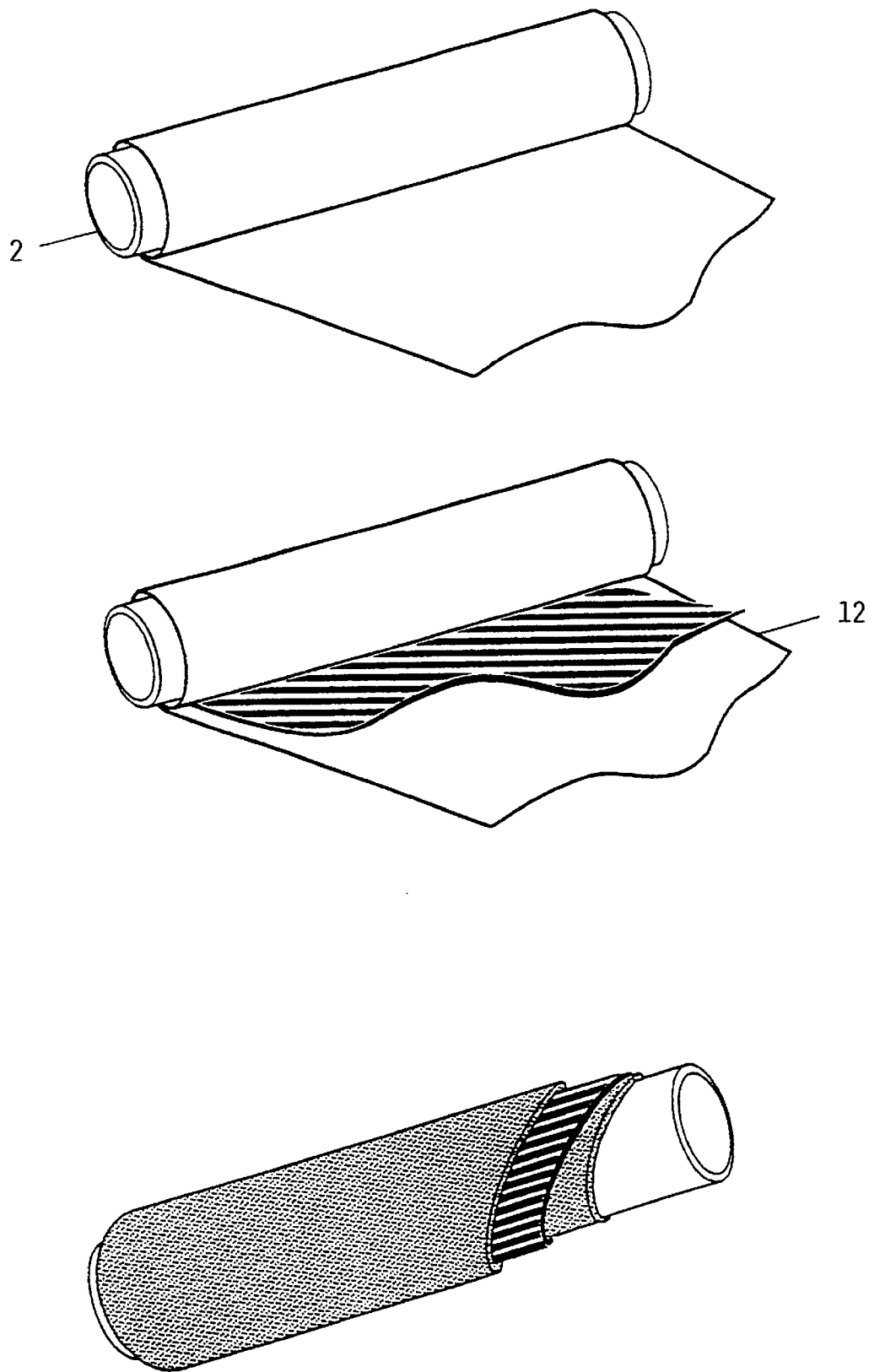
Figure 4:
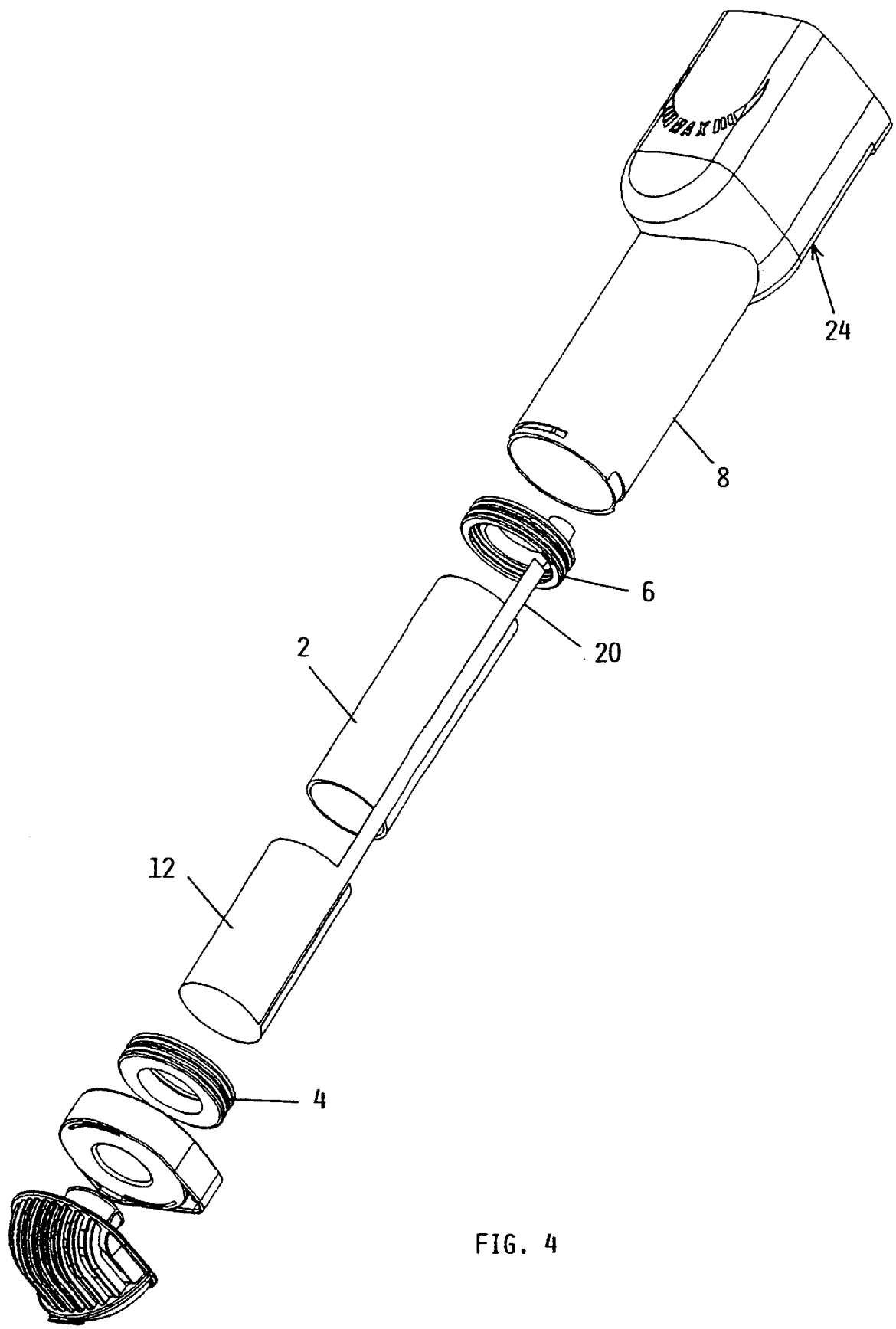

A preferred embodiment of the invention is described in detail hereinafter with reference to the accompanying drawings, on which:

FIG. 1 is a schematic longitudinal section through a thermostatic heater device according to the invention, FIG. 2 is a schematic plan view of a resistive element obtained from silk-screen printed film, FIG. 3 is a schematic view of certain successive stages of the procedure for constructing the device, and FIG. 4 is an exploded perspective view of a heater device of the invention as used to form a thermal pump for an aquarium.

As can be seen from the figures the device of the invention comprises a tubular support 2 constructed of electrically insulating, heat-conducting rigid material about which a heating element, indicated overall by 12, is wound.

The tubular support preferably consists of a piece of cylindrical glass tube open at its ends, on which there are mounted two preferably rubber annular gaskets, namely a lower one 4 and an upper one 6. Both the gaskets have an annular seat to house the corresponding end of the glass support 2 and have their outer annular surface provided with a plurality of parallel circumferential ribs arranged to form a substantial seal with a cylindrical casing 8.

The upper gasket 6 differs from the lower gasket 4 by the presence of an appendix 10 comprising an axial sealing passage for the electrical connections of the heating element.

The heating element 12 preferably consists of a mylar film 14 on which a resistive ink is printed by traditional silk-screen printing. FIG. 2 shows a plan view of this heating element, which consists of a rectangular mylar support of length just less than the circumference of the tubular support 2 and of height less than the distance between the two gaskets 4 and 6 applied thereto. It is provided with a PTC resistive ink deposit which extends over the entire surface of the mylar support with the exclusion of a small region to which there is glued a temperature sensor 18, which is to be located at the lower end of the device when installed. The resistive element and the circuit connected to the temperature sensor extend beyond the rectangular mylar support along an appendix 20 forming part of the support and extending in the direction away from the temperature sensor.

The resistive element can be advantageously obtained starting from a mylar web on which the entire resistive circuit and the connections to the outside is silk-screen printed with resistive ink, after which is cut by die-cutting to form at each blow two resistive elements with their respective appendices 20. The heat-sensitive element 18 is then glued to each resistive element in the required position, so that is makes electrical connection with the two tracks 22 of the control circuit.

The device of the invention is formed by winding a film of polyester material on the tubular support 2 until a layer of the desired thickness compatible with insulation requirements has been formed on the outside of said support, after which the heating element 12 already provided with the temperature sensor is positioned on said polyester film and the winding continued until the sensor is finally interposed between two layers of insulating material. When winding is complete, the lower gasket 4 is applied to the tubular support followed by the upper gasket 6, through which the appendix 20 with the electrical connections is passed.

Hence in practice the heating element 12 of the device of the invention comprises a tubular support 2 with the gaskets 4, 6 applied to its ends, a first layer of polyester film wound on the tubular support, the resistive film adhering to the outside of the first layer and passing with its appendix 20 through the upper gasket 6, and a second layer of polyester film covering the resistive film.

The heating element 12 formed in this manner can then be inserted into the casing 8 of a traditional pump 24, which can be connected to the electrical power and control components via the tracks of the appendix 20.

A traditional thermal protector element (not shown on the drawings) in the form of a thermal fuse or a bimetallic strip is advantageously provided in correspondence with that edge of the resistive film distant from the temperature sensor, ie in the upper part of the heater device, to protect the device from excessive temperature increase.

The thermostatic heater device of the invention is particularly advantageous, and in particular:

it has double electrical insulation and hence satisfies the most recent regulations, it uses a heat-sensitive element which is located much closer to the water to be temperature-controlled than to the resistive element, and is hence substantially uninfluenced by factors which could alter its sensitivity. Moreover this heat-sensitive element is positioned in correspondence with that end of the tubular support which is the first to receive the flow of water to be controlled, with the result that the thermostatic heater cuts out very rapidly, it comprises a thermal protector element positioned in the highest part of the heater device, ie in that part which is at the highest temperature when no water is circulating. Consequently it is able to act rapidly in the case of accidental stoppage of the water circulation pump, to prevent negative consequences arising, it achieves all the aforesaid advantages by means of a very simple and economical construction, together with considerable ease of assembly.

What is claimed is:

1. A method for producing a thermostatic heater comprising the steps of:

continuously winding for at least twice an entire circumference of a tubular rigid hollow support constructed of electrically insulating heat-conducting material with an electrically insulating heat-resistant flexible film, introducing between a first layer and a second layer a portion of a dielectric flexible film having a length corresponding to said circumference of said support, said dielectric flexible film being provided with a resistive element arranged on a surface of said film facing the first layer of said electrically insulating flexible film, providing said resistive element with connecting means to an electrical supply, introducing said support within a tubular casing, and applying hydraulic sealing means between said tubular support and said tubular casing.

2. A thermostatic heater device for liquids comprising within a tubular casing:

a rigid tubular support constructed of electrically insulating, heat-conducting material, at least one first layer of an electrically insulating heat-resistant flexible film wound about said tubular support, at least one resistive element arranged on a dielectric film wrapped about said first flexible film, a second layer of said electrically insulating, heat-resistant flexible film wound about said dielectric film already wrapped about said first layer of flexible film, means for connecting said resistive element to the electrical supply, and hydraulic sealing means between said tubular support and said casing.

3. A device as claimed in claim 2, further comprising a thermostat acting on said electrical supply.

4. A device as claimed in claim 2, wherein said tubular support is constructed of glass.

5. A device as claimed in claim 2, wherein seal gaskets are mounted on ends of said support for its insertion into said casing.

6. A device as claimed in claim 2, wherein an assemblage formed by said two film layers with said interposed resistive element extends into an appendix provided with conducting tracks.

7. A device as claimed in claim 2, further comprising a thermal protection element.

8. A device as claimed in claim 2, wherein said flexible material films are formed of polyester.

9. A device as claimed in claim 2, wherein said resistive element is a layer of PTC ink.

* * * * *